Figure 1:
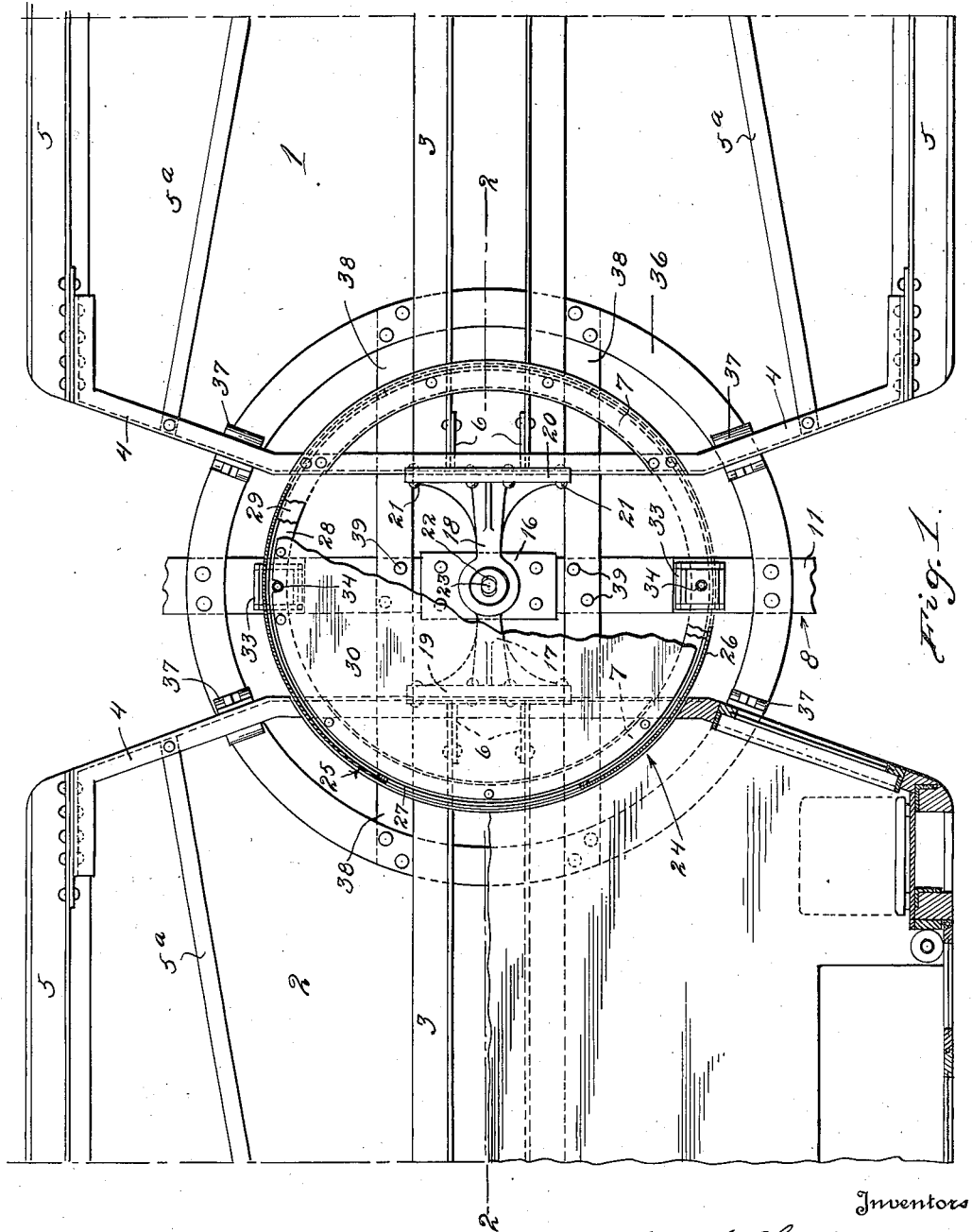

Feb. 15, 1927.

A. T. CLARK ET AL 1,617,667

ARTICULATED CAR CONSTRUCTION

Filed June 6, 1925 4 Sheets-Sheet 1

Inventors
Alfred T. Clark
Henry A. Leonhauser
J. Rohn, Jr.
By
Attorney

Feb. 15, 1927.

A. T. CLARK ET AL 1,617,667

ARTICULATED CAR CONSTRUCTION

Filed June 6, 1925   4 Sheets-Sheet 2

Inventor
Alfred T. Clark
Henry A. Leonhauser
J. Roland Foster
By Frank J. Mechlin
their Attorney Feb. 15, 1927.
A. T. CLARK ET AL
1,617,667
ARTICULATED CAR CONSTRUCTION
Filed June 6, 1925  4 Sheets-Sheet 3
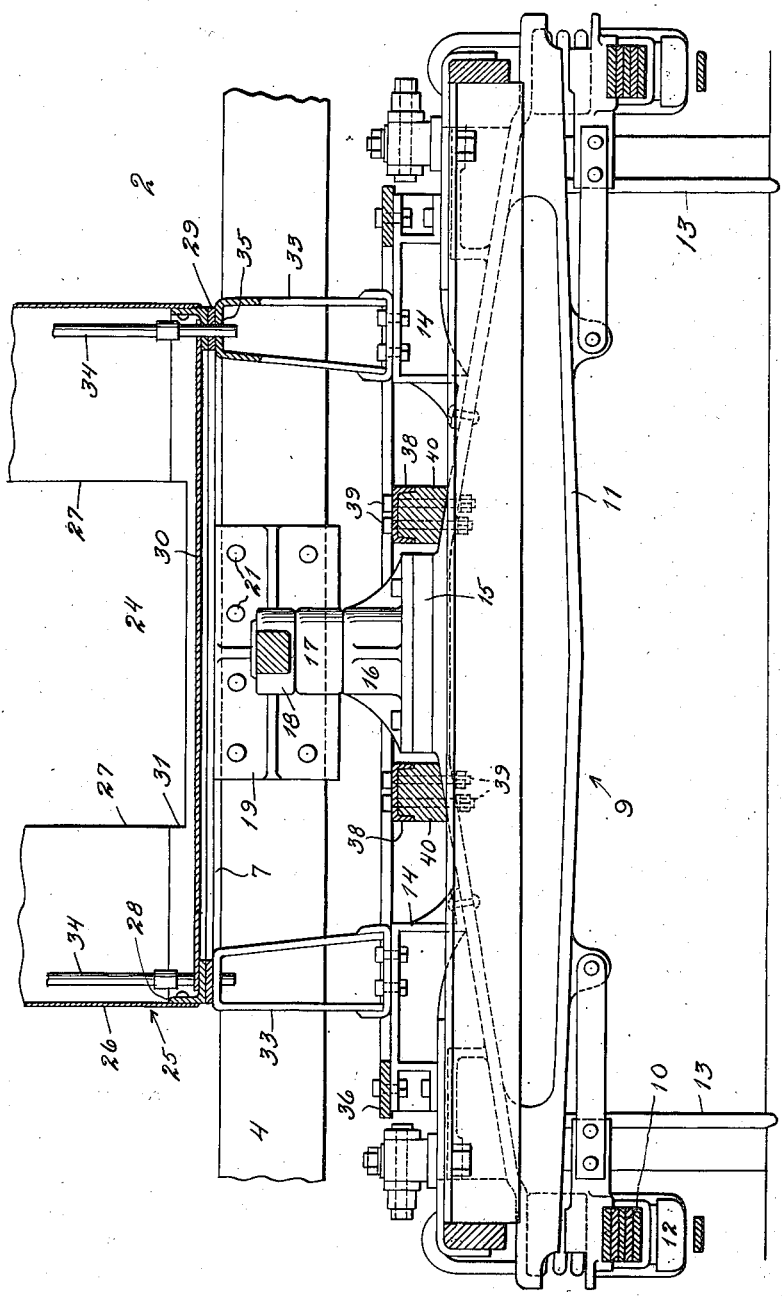

Feb. 15, 1927.

A. T. CLARK ET AL 1,617,667

ARTICULATED CAR CONSTRUCTION

Filed June 6, 1925     4 Sheets-Sheet 4

Patented Feb. 15, 1927.

1,617,667

UNITED STATES PATENT OFFICE.

ALFRED T. CLARK, HENRY A. LEONHAUSER, AND JOHN R. JESTER, OF BALTIMORE, MARYLAND.

ARTICULATED CAR CONSTRUCTION.

Application filed June 6, 1925. Serial No. 35,475.

The invention relates to articulated cars and has particular reference to the connecting means for the adjacent car sections.

The principal object of the invention, generally stated, is to provide a truck having means for supporting and guiding the end portions of the car sections and also for supporting the drum which constitutes the vestibule between the sections.

An object of the invention, more specifically stated, is to provide a truck and supporting means thereon located in such position as to adequately support elements carried by the adjacent end portions of the car sections while permitting the necessary relative movement as when rounding curves, the truck also having means for relatively stationarily supporting the vestibule forming drum, the drum being consequently movable with respect to the car sections.

Another object of the invention is the provision of means on the adjacent ends of the car sections rotatably supporting the drum throughout the major portion thereof.

Yet another object of the invention is to provide a truck located beneath the point of articulation of the car sections and having means thereon pivotally connected with and connecting elements on the adjacent ends of the car sections for supporting the car sections, the truck being further equipped with bearing means engaged by depending elements on the adjacent ends of the sections for guiding them properly with respect to the truck when pivotal movement occurs.

A further object of the invention is to provide a truck having a relatively low body construction permitting the installation of the car end supporting and guiding means and the drum supporting means.

More specifically the invention resides in the provision of an articulated car truck carrying a curved track engaged by bearing shoes spaced apart and depending from the adjacent ends of the car sections, together with upstanding supporting members upon which the drum constituting the vestibule rests, the construction and arrangement of the parts constituting the last named feature being such that the drum will be stationary with respect to the truck and movable with respect to both car sections when pivotal movement at the articulation occurs.

A still further object is to provide means for mounting the car section guide member on the truck and for bracing and reinforcing said member to give it the requisite strength for withstanding the strains and stresses upon it in service.

Still another object of the invention is to provide bracket means for mounting upon the truck to form a support for the drum, the connection of the drum with the brackets being such as to permit yielding of the drum and prevent damage thereto when any rocking of the car occurs.

In addition to the above objects the invention further contemplates the provision of a supporting and guiding means and devices of this character possessing such structural characteristics as to permit the necessary free movement of the car sections and other parts relatively to one another while the likelihood of wear and consequent looseness and excessive play will be avoided.

To the attainment of the foregoing and other objects and advantages the invention may consist in the construction, arrangement and combination of parts to be hereinafter more fully described and claimed and illustrated in the accompanying drawings wherein like characters of reference designate corresponding parts throughout the several views.

In the drawings:

Figure 1 is a horizontal section taken through the drum at the point of articulation, this view showing the general arrangement of the parts and the underframing of the adjacent ends of the car sections, only a small portion of the supporting truck being shown.

Figure 6:
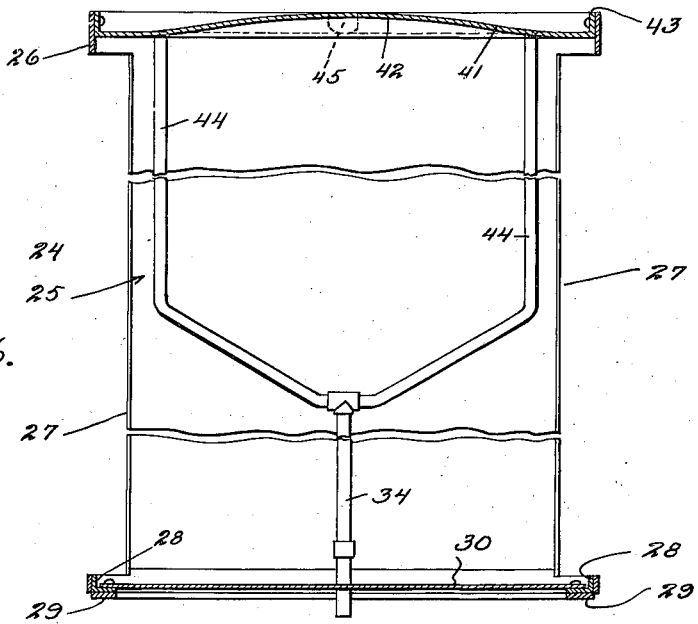
Figure 7:
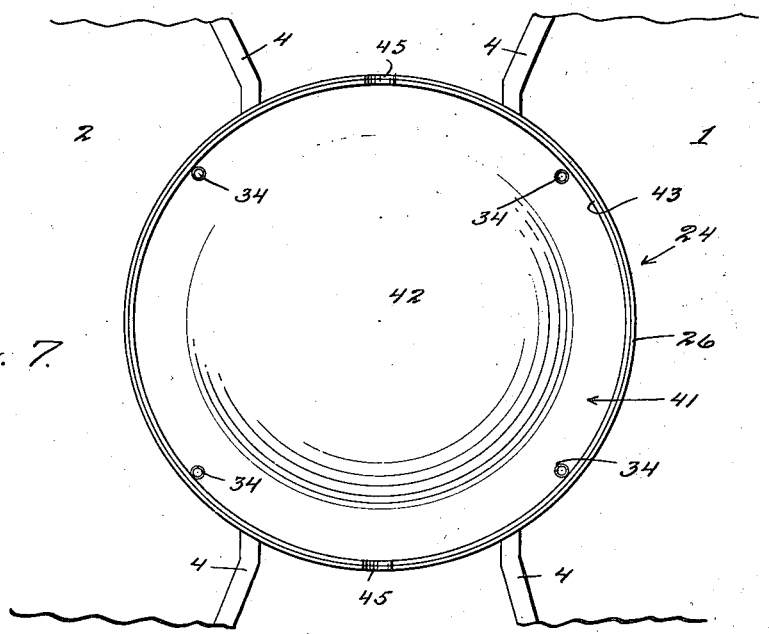

Figure 2 is a vertical section taken longitudinally of the car sections along substantially the line 2—2 of Figure 1, Figure 3 is a vertical cross section taken along substantially the line 3—3 of Figure 2, Figure 4 is a detail section through one lower edge of the drum and ring engaged thereby, this view being on a considerably larger scale, Figure 5 is a detail view of one of the supporting shoes, Figure 6 is a vertical section through the drum, Figure 7 is a plan view thereof.

Referring to the drawings in detail, we have shown a portion of an articulated car including forward and rear sections designated generally at 1 and 2. These sections are not necessarily similar though the underframing for both may be substantially the same except in so far as certain variations occur on account of differences in the floor plan. The underframe of each section is shown as including center sills 3, end sills 4, preferably formed as channel bars, side sills 5 and reinforcing members 5ª which connect with the end sills. As is customary in car construction the underframe generally includes body bolsters and many other detailed features which are not disclosed herein inasmuch as they form no part of the present invention. Secured between the center sills at the end sills are angle plates 6 which may not be essential but which are provided for reinforcing purposes. Secured upon the adjacent ends of the sections 1 and 2 are bearing segments or arcuate members 7 riveted or otherwise suitably held in place. Whether or not these bearing members are disposed entirely above the underframes or let thereinto is a mere mechanical detail and a matter of choice.

For supporting and pivotally connecting the adjacent ends of the sections 1 and 2 we provide a truck indicated generally at 8 which truck includes suitable side frames 9 which are of low construction having spring means 10 therein for suitably supporting a bolster 11. Naturally, the truck side frames are also provided with suitable openings for spring pressed journal boxes 12 for the axles which carry the wheels 13. Of course the truck may be provided with any suitable or preferred type of brake mechanism and embodies structural features common to many trucks. As such details form no particular part of the present invention they are not particularly pointed out and are not stressed. For the purposes of the present invention it is believed to be sufficient to point out that the bolster 11 carries supports 14 for a purpose to be described, and is provided at its center with a seat carrying a block or other filler 15 mounted thereon in any desired manner.

Suitably secured upon the block 15, or its equivalent, is an upstanding bearing member 16, and secured upon the confronting faces of the car section end sills 4 are bracket members 17 and 18, the former of which is disposed upon the bearing member 16 and the latter of which is disposed upon the bracket member 17. These bracket members include preferably channeled attaching portions 19 and 20, respectively, straddlingly engaged upon and suitably secured to the end sills 4 of the car sections 2 and 1, respectively, the securing means in the present instance being represented as rivets or the like 21 some of which may pass merely through the end sills and others of which may pass through the end sills and the angle plates 6.

The contacting portions or heads of the bracket members 17 and 18 and the bearing member 16 have elongated or elliptical openings 22 therein for the accommodation of a pivot or king bolt or pin 23 as clearly indicated in Figure 1, the purpose of the elongation of the openings being to permit flexibility and prevent binding. By this means it will be seen that the two car sections are pivotally connected with respect to each other and with respect to the truck so that the car may travel along a curve.

Cars of this general type embody a vestibule structure at the adjacent ends of the sections so that passengers may pass to and fro from one section to the other at will and even while the car is travelling about a curve. In the present instance we have shown this vestibule structure, designated generally by the numeral 24, as including an upstanding cylindrical drum 25 of requisite size and including a cylindrical shell portion or sheathing 26 of sheet metal formed with openings 27 at opposite sides for establishing communication between the car sections. At its lower end the shell or sheathing 26 is riveted or otherwise suitably secured to a circular angle ring 28 beneath which is suitably secured a wear ring 29 bearing upon the segments or arcuate wear members 7 on the adjacent end portions of the car section underframes. Naturally this vestibule or drum must be closed at its bottom and we have consequently illustrated a sheet metal plate or disk 30 suitably secured to the horizontal flange of the angle ring 28. In actual practice any desired flooring, not shown, may of course be laid upon this bottom plate or disk. At the openings 27 the angle ring is shown as having its vertical flange cut away at 31 so that the resultant horizontal edge will be flush with the floor line 32 of the car.

In accordance with what we have discovered to be the best principles of design, we prefer that the drum or vestibule forming member be held stationary at all times with respect to the truck. For accomplishing this result we have shown a pair of upstanding bracket members 33 of any desired formation mounted upon the bracket members or supports 14 carried by the truck bolster 11.

These bracket members are bolted or otherwise suitably secured in place at their lower ends and the upper ends are at such a level or height that the wear ring 29 on the drum or vestibule forming member will bear directly thereon. In this way it is clear that the drum will be supported at opposite areas of its lower edge by the segments or bearing members 7 and will be further supported at points between the car sections by means of these brackets 33. Drums or vestibules of this general type are ordinarily provided with drain pipes 34 which extend downwardly from the top for the purpose of carrying off any water which accumulates on top of the drum or vestibule in wet weather. In order that the drum may, in the present instance, be held stationary or at least non-rotatable with respect to the truck and the brackets 33 thereon, we have shown the upper ends of the brackets as formed with holes 35 which receive the lower ends of the pipes 34. By this arrangement, it will be quite obvious that the drum cannot turn with respect to the brackets 33, and consequently the truck, but may turn freely with respect to the car sections or in accordance with the movement of the truck itself as when rounding curves.

To prevent excessive side sway or rocking of the car sections, we provide supporting means therefor preferably comprising a bearing ring or rail member 36 bolted or otherwise suitably secured upon the upstanding bracket members 14 carried by the truck bolster, and also provide a plurality of bearing shoes, indicated generally at 37, mounted on the end portions of the car sections and positioned to engage constantly upon the bearing ring 36. For reinforcing the bearing ring and supporting it at points in addition to those at which it is secured to the bracket members 14, we preferably provide channeled or other suitable cross sectionally shaped arms or bars 38 secured at their outer ends to the ring 36 at the underside thereof and secured at their intermediate portions to the truck. In the present instance this latter mentioned securing means is shown as including bolts 39 or the like passing through the arms or bars and through filler blocks 40 disposed on the truck bolster.

While the bearing shoes 37 mounted on the car sections might be varied in their detailed construction they may conveniently be formed as bracket members of a more or less open frame-like construction including upstanding portions 41 bolted or otherwise suitably secured to the end sills 4, and elongated bottom portions 42 which are preferably shod with any desired number of easily replaceable wear plates 43 constructed preferably of spring steel and detachably held in place by bolts or the like indicated at 44. By this construction it will be seen that when excessive wear of these plates occurs they may be removed and replaced by new ones. Furthermore they act as shims inasmuch as any tendency of the car sections to rock excessively during travel may be eliminated by increasing the number of wear plates. By properly varying the number of shims any necessary adjustment as to the relative heights of the car sections may be made.

Reverting to the drum structure, we preferably provide a cap or cover 41 telescoped within the sheathing 26 and having an upwardly bowed central portion 42 and an upstanding peripheral flange 43 riveted or otherwise suitably secured to the shell. By having the cap or cover bowed it is obvious that rain or other water will gravitate to the edge portion from which lead the branches 44 of the pipes 34. As it is possible that these pipes may become clogged with leaves or other rubbish, the flange 43 and upper edge of the shell are notched at 45 at points between the car sections so as to permit any excessive accumulation of water to flow down the outside of the drum instead of entering the car.

In the use of an articulated car constructed in accordance with this invention it is apparent that the point of articulation is adequately supported by the truck, that the car sections are properly pivotally connected by the king bolt or pin, that the drum or vestibule forming member is stationary with respect to the bolster and freely rotatable with respect to the car sections and that the car sections themselves are braced and supported with respect to the truck. The cooperation, arrangement and combination of these various elements will insure freedom of movement, as is necessary during travel, while preventing any undesired movement which might result in excessive wear and eventuate in destruction of the parts. It will also be noted that the various parts employed are simple in themselves and easily capable of production at small cost and that there will be a minimum amount of labor and time involved in the installation.

While we have shown and described the preferred embodiment of the invention involving a certain arrangement of parts, it should of course be understood that the disclosure is merely illustrative as the right is reserved to make all such changes and variations in the details of design and construction to increase the adaptability of the invention and widen the field of its utility, provided such modifications constitute no departure from the salient features of the invention or the scope of the claims hereunto appended.

Having thus described the invention, we claim:

1. In an articulated car, a truck located beneath the adjacent ends of the car sections, members projecting from the adjacent ends of the car sections and pivoted to the truck, a guide rail carried by the truck, and a plurality of members depending from the ends of the car sections and engaging slidably upon said guide rail at a substantially uniform radial distance from the pivotal connection with the truck.

2. In an articulated car including sections, in combination with a truck located beneath the adjacent ends thereof, means for pivotally connecting the sections with the truck, a circular guide rail on the truck, and shoe members depending from the end portions of the car sections and slidably engaging upon said guide rail.

3. In an articulated car including sections, the combination of a truck located beneath the adjacent ends of the sections, members projecting from the adjacent ends of the sections pivotally connected with each other and with the truck, upright guide members on the adjacent ends of the sections, and a drum slidably engaged upon said guide members and stationarily mounted upon the truck.

4. In an articulated car including sections, the combination of a truck located beneath the adjacent ends of the sections, members projecting from the adjacent ends of the sections pivotally connected with each other and with the truck, guide members on the adjacent ends of the sections, a drum slidably engaged upon said guide members and stationarily mounted upon the truck, circular guide means on the truck concentric with said first-named guide means, and members depending from the adjacent ends of the car sections bearing upon said last-named guide means.

5. In an articulated car including sections, the combination of a truck located beneath the adjacent ends of the sections, means on the truck guidably supporting the adjacent ends of the sections, means on the truck pivotally connecting the sections thereto and to each other, a drum located at the adjacent ends of the sections, guide means on the sections movably engaged by the drum, and supporting means on the truck stationarily mounting the drum with respect thereto.

6. In an articulated car including sections, the combination of a truck located beneath the adjacent ends of the sections, means carried by the sections pivotally connected with the truck, guide members on the adjacent ends of the cars, a vestibule forming drum mounted above the truck coaxially of the pivotal point of said connecting means, said drum being disposed upon said guide members, and means carried by the truck and connected with the drum for retaining the latter stationary with respect to the truck.

7. In an articulated car including sections, the combination of a truck located beneath the adjacent ends of the sections, means carried by the sections pivotally connected with the truck, guide members on the adjacent ends of the cars, a vestibule forming drum mounted above the truck coaxially of the pivotal point of said connecting means, said drum being disposed upon said guide members, means carried by the truck and connected with the drum for retaining the latter stationary with respect to the truck, including upstanding brackets on the truck having holes therein, and drain pipes in the drum extending through said holes.

8. In an articulated car including sections, a truck located beneath the adjacent ends of the sections, means on the truck pivotally connecting the sections, a bearing ring on the truck, shoe members depending from the adjacent ends of the sections and riding upon said ring.

9. In an articulated car including sections, a truck located beneath the adjacent ends of the sections, means on the truck pivotally connecting the sections, a bearing ring on the truck, shoe members depending from the adjacent ends of the sections and riding upon said ring, and means carried by the shoe members and acting as shims whereby the length of the shoe members may be varied to take up side sway of the car sections with respect to the truck.

10. In an articulated car including pivotally connected sections, a truck mounted beneath the adjacent ends of the sections and connected with said pivot, a bearing ring on the truck stationary with respect thereto, members depending from the car sections and riding upon said ring, a vestibule forming drum located in concentric relation to said pivotal connection of the sections, means on the truck engaging the drum for holding the latter stationary with respect to the former, and means on the car sections rotatably supporting the drum.

In testimony whereof we affix our signatures.

ALFRED T. CLARK.
HENRY A. LEONHAUSER.
JOHN R. JESTER.